United States Patent
Rischke

(10) Patent No.: US 11,215,527 B2
(45) Date of Patent: Jan. 4, 2022

(54) HEADLIGHT SETTING TEST DEVICE, HEADLIGHT SETTING TEST STATION, HEADLIGHT SETTING DEVICE AND METHOD FOR TESTING A HEADLIGHT SETTING

(71) Applicant: Sherpa Autodiagnostik GmbH, Mühldorf (DE)

(72) Inventor: Manfred Rischke, Dietratried (DE)

( * ) Notice: Subject to any disclaimer, the term of this patent is extended or adjusted under 35 U.S.C. 154(b) by 0 days.

(21) Appl. No.: 16/341,916

(22) PCT Filed: Oct. 5, 2017

(86) PCT No.: PCT/EP2017/075350
§ 371 (c)(1),
(2) Date: Apr. 14, 2019

(87) PCT Pub. No.: WO2018/069143
PCT Pub. Date: Apr. 19, 2018

(65) Prior Publication Data
US 2019/0242784 A1 Aug. 8, 2019

(30) Foreign Application Priority Data
Oct. 14, 2016 (DE) .......................... 102016119633.9

(51) Int. Cl.
*G01M 11/06* (2006.01)
*F21S 41/20* (2018.01)
(52) U.S. Cl.
CPC .......... *G01M 11/067* (2013.01); *F21S 41/20* (2018.01)
(58) Field of Classification Search
None
See application file for complete search history.

(56) References Cited

U.S. PATENT DOCUMENTS 4,973,155 A   11/1990   Masuda

FOREIGN PATENT DOCUMENTS

| DE | 102013019022 A1 | 5/2015 | |
|---|---|---|---|
| DE | 102016001186 | 8/2016 | |
| DE | 102016001186 A1 * | 8/2016 | .......... G01M 11/061 |
| DE | 102015223500 | 6/2017 | |
| EP | 2743637 | 6/2014 | |

OTHER PUBLICATIONS

European Patent Office, International Search Report, PCT/EP2017/075350, dated Jan. 22, 2018.

* cited by examiner

*Primary Examiner* — Britt D Hanley
(74) *Attorney, Agent, or Firm* — Ryder, Mazzeo & Konieczny LLC; Joseph M. Konieczny, Sr.

(57) ABSTRACT

The present invention relates to a headlight setting test device comprising a lens, which directs an image of the tested headlight on a monitor, comprising a data memory, which stores the height difference between the contact area of a rear wheel arranged on the side of the relevant headlight being tested and the contact area of the corresponding front wheel or a value corresponding to said height difference, and comprising a correction possibility—taking account of the relevant height difference or value—for the position of the image on the monitor, as a result of which the effect of the height difference on the assessment of the relevant setting of the relevant headlight is able to be compensated for. The invention furthermore relates to a headlight setting station, a headlight setting device and a method for testing a headlight setting.

18 Claims, 15 Drawing Sheets

HIGH BEAM

LOW BEAM

HIGH BEAM

LOW BEAM

FOG LIGHT

HIGH BEAM

Figure 1:
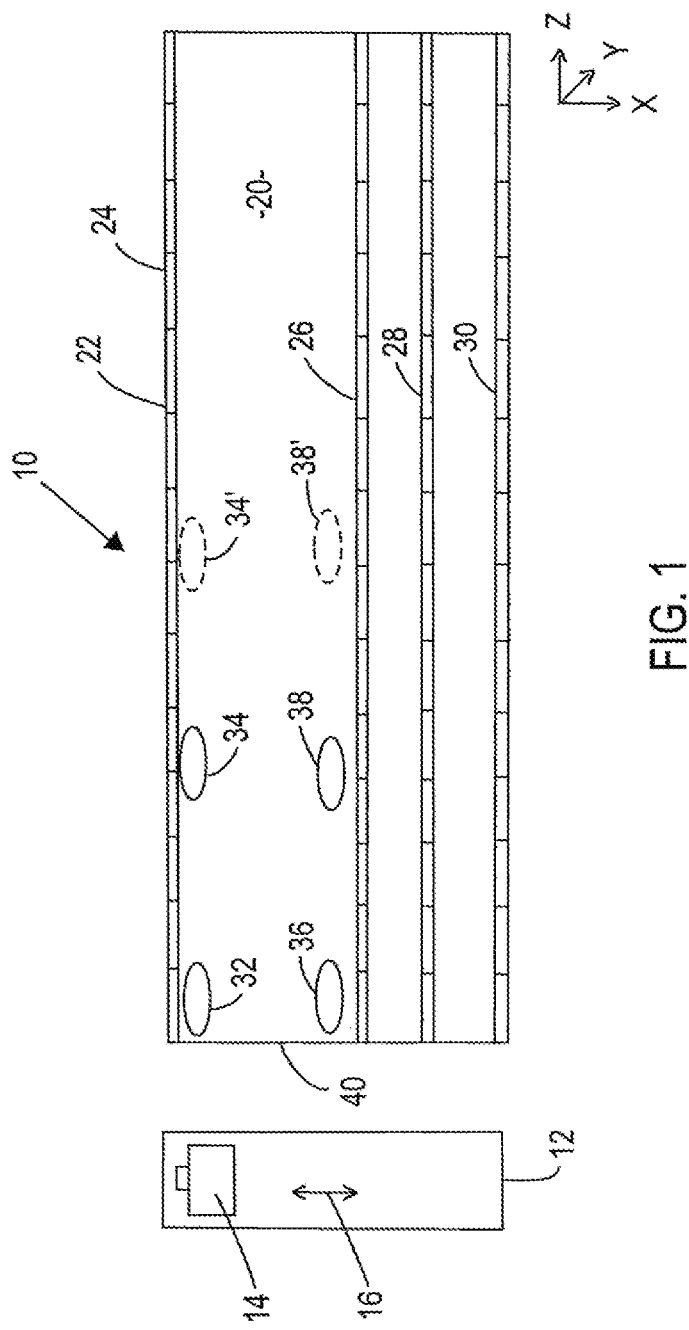

HEADLIGHT SETTING TEST DEVICE, HEADLIGHT SETTING TEST STATION, HEADLIGHT SETTING DEVICE AND METHOD FOR TESTING A HEADLIGHT SETTING

The present invention relates to a headlamp setting test device, to a headlamp setting test station bearing markings, to a headlamp setting device, and to a method for testing a setting of headlamps of a vehicle.

Headlamp setting test devices having a lens, typically a Fresnel lens, directing an image of the tested headlamp to a monitor are known per se. The monitor frequently comprises a screen or a plate that bears a marking and that is accommodated within a movable box. The screen or plate is visible to the inspecting person through a window of the box. The box is frequently installed at the side at a column that is travelable on a base frame having wheels. The box is fastened to the column by means of a holder that makes it possible to vary the angular position of the box within a vertical plane. The headlamp setting test device is positioned in front of a headlamp to be tested and the box is adjusted in height so that it is aligned in a horizontal alignment with the respective headlamp to be tested. The horizontal position of the headlamp setting test device is tested using a spirit level provided at the headlamp setting test device. The alignment of the box with the respective tested headlamp should take place such that the center of the lens, i.e. the center axis of the box, is aligned with the center of the headlamp. This alignment is visually estimated by the inspecting person, frequently with the aid of a central tip at the front side of the lens.

Most headlamps bear an index number that is related to the optical properties of the headlamp. This index number is typically set at a manual wheel positioned behind the box and has the result that the height of the screen bearing the marking or of the corresponding plate is set by means of a corresponding mechanism as an adaptation to the headlamp.

The user now has the possibility of observing an image of the light lobe starting from the headlamp and generated by the lens on the monitor formed by the screen or by the plate and to check the position of the image with respect to the marking. If the alignment of the image coincides with the marking, it is assumed that the setting of the headlamp is correct. If the alignment is not correct, the alignment of the headlamp is changed for so long until the alignment is correct; the headlamp is then deemed to be set. With motor vehicles having two main headlamps, the test is then carried out for the second main headlamp.

With one main headlamp, the image for both the high beam and for the low beam is tested. The term headlamps, however, not only comprises main headlamps having a high beam and a low beam, but also fog lamps and additional lamps if they are provided. All lamps of this kind that are installed on a vehicle have to be tested so that they do not dazzle oncoming traffic and to ensure that they work in the approved manner and light up a road sufficiently.

As part of a desired improvement of the setting test of the headlamps, a test guideline has been issued for the headlamp setting in the general inspection that makes strict demands on the properties of the headlamp setting test station, in particular on the evenness of the provided headlamp setting test station, that are difficult to meet. The unevenness of the headlamp setting test station, for example, may not exceed more than 1 mm/m. Such tolerances can only be satisfied with a greater effort with a cement flooring or a tiled floor. Due these demands, steel plates are currently offered that cover the intended surface of the headlamp setting test station and that are adjustable. Such plates, however, result in costs of several thousand euros and are unaffordable for smaller auto shops.

The use of such a steel plate furthermore produces vertical steps on the floor of the auto shop that represent stumbling blocks and that make a cleaning of the auto shop more difficult. The sinking of the steel plate in the floor—so that is at least substantially flush with the floor—would produce even higher costs and stumbling edges would anyway be present since it can be assumed that the floor of the auto shop is not even as a rule, which is the reason for the necessity for using such steel plates.

There is the possibility of carrying out the headlamp setting test on a lifting platform that has rails and that represents the headlamp setting test station; however, a large number of lifting platforms do not satisfy the strict demands on evenness and a setting is frequently not provided or is not retroactively provided.

It is the object of the present invention to provide a headlamp setting test device or a setting method that can be used on a headlamp setting test station not having the required evenness and that nevertheless enables a reliable setting test that conforms to the provided guidelines, and indeed without any unreasonable effort and without having to use a complex setting plate, wherein the headlamp setting test device and the headlamp setting test station used therewith should also be affordable for smaller auto shops so that general inspections on vehicles can also be carried out in them in the future. A headlamp setting test station should furthermore be provided that is suitable for use with such a headlamp setting test device.

A headlamp setting test device is provided to satisfy this object having a lens directing an image of the tested headlamp to a monitor, having a data memory that stores the vertical difference between the contact patch of a rear wheel arranged on the side of the respective tested headlamp and the contact patch of the corresponding front wheel or a value corresponding to this vertical difference, and having a correction possibility for the position of the image on the monitor that takes account of the respective vertical difference or value, whereby the effect of the vertical distance on the evaluation of the respective setting of the respective headlamp can be compensated.

It has namely been recognized in accordance with the invention that it is not necessary at all to make strict demands on the evenness of the headlamp setting test station as long as the vertical difference between the positions of the contact patches of the rear wheel and of the front wheel and the spacing between these contact patches associated with the respective measured headlamp are known. Measurement preferably takes place at the center of the respective contact patches.

Said vertical difference has the result, independently of the spacing between the respective contact patches, of an angle-wise deviation of the position of the respective measured headlamp, with this angle representing a value that corresponds to the vertical difference for the respective vehicle (since the spacing between the contact patches represents a vehicle-specific parameter. This angle-wise deviation of the headlamp with respect to the horizontal results in a displacement of the image on the monitor. In accordance with the invention, this displacement can be compensated such that the unevenness of the headlamp setting test station for the respective tested vehicle no longer falsifies the test.

The headlamp setting test station can be configured for any desired vehicles such as motorcycles, passenger cars and trucks, in any desired combination depending on which kind of vehicles should be tested.

Since the headlamp setting test device configured in accordance with the invention is relatively simple to implement and only has to be operated with a correspondingly configured headlamp setting test station in which no special demands have to be made with respect to the evenness of the test station, the solution in accordance with the invention can be offered at an affordable price so that smaller auto shops can also use it, and indeed without any stumbling edges being produced. An already existing area in an auto shop can be configured and marked for the test without any technical construction measures being necessary. The solution in accordance with the invention nevertheless satisfies the provided guideline with an accurate test.

There are various possibilities of configuring the monitor in accordance with the invention. It can be a pixel-recording digital camera, in particular a CMOS camera, a CCD camera or another electronic recording unit recording pixels of the image.

The use of a digital camera in a setting test device is admittedly known per se, but in the known solution the digital camera is used to capture the distribution of the light intensity on the monitor without interfering blue light portions disrupting the evaluation. The digital camera used, however, does not serve for the compensation of unevenness of the headlamp setting station such as provided in accordance with the invention.

A possibility of the compensation in accordance with the invention comprises associating a reference marking with the pixels of the digital camera, with the position of said reference marking being able to be compensated, in particular being able to be displaced at least vertically, in accordance with the respective vertical difference or value stored in the data memory. To explain this more precisely, it can be assumed, for example for a twelve megapixel digital camera, that the sensors capturing light pixels are arranged in four thousand columns and in three thousand rows. Let it first be assumed that a reference marking composed of a horizontal line runs through the center of the image plane of the digital camera, i.e. extends from x=0, y=1500 to x=4000, y=1500 and that this would apply when the vehicle stands on a 100% even floor. If, however, the reference marking is displaced, for example downwardly in they direction by 100 pixels due to the respective vertical differences present and to the corresponding angle-wise displacement of the headlamp, the row of pixels that extends from x=0, y=1400 to x=4000, y=1400 is then selected as the reference marking.

In other words, the reference marking is electronically displaced on the photo elements of the digital camera to compensate the respective applicable vertical difference. This is the preferred solution in accordance with the invention since such a compensation can be implemented inexpensively.

Such a compensation is, however, not necessarily required; instead, the monitor bearing the marking could be vertically displaceable and/or inclinable about a horizontal axis in accordance with the respective vertical difference or value stored in the data memory, whereby the position of the monitor bearing the marking is movable in accordance with the respective vertical difference or value and the test result does not falsify the setting of the headlamp. Such movements of the monitor can be implemented with the aid of inexpensively available actuators or stepper motors. If the mentioned compensation of the floor unevenness is to be implemented by means of a pivoting of the monitor bearing the marking about a horizontal axis, the axis has to be provided in front of or behind the monitor since a physical movement of the monitor in a vertical manner can only be implemented in this manner.

The monitor used does not necessarily have to be a digital camera, it could also be a conventional reflective surface.

The monitor can in any case, whether it is a digital camera or a reflective surface, bear a reference marking and be vertically displaceable and/or inclinable about a horizontal axis in accordance with the respective vertical difference or value stored in the data memory, whereby the position of the reference marking is movable in accordance with the respective vertical difference or value and the test result does not falsify the setting of the headlamp.

Another possibility would comprise projecting or generating the marking on the screen or plate and adjusting the projector or the generator in accordance with the desired compensation.

It is particularly preferred if the headlamp setting test device in accordance with the invention has a data memory that comprises data that correspond to the topography of the respective headlamp setting test station. In accordance with the invention, it is as a rule assumed that the topography of the test station intended for the setting test is measured from time to time, for example every second year, and that the corresponding measured values are stored in the data memory in dependence on their position. The number and distribution of the measured points can be selected as desired and the storage can take place such that only measured points that differ from a plane are stored. The number of measured points or their distribution does not necessarily have to be very high.

The stored data preferably comprise tabular values that correspond to the respective vertical difference between possible contact patches of a rear wheel and possible contact patches of a front wheel on the headlamp setting test station.

It is first assumed that the typical procedure in a headlamp setting test comprises driving the vehicle to be tested onto the headlamp setting test station provided for this purpose until the contact patches of the front wheels reach a specific predefined position in the longitudinal direction of the headlamp setting test station. This is preferred because the headlamp setting test device is normally only displaceably arranged in a provided defined and especially marked region of the headlamp setting test station to the left and right of the middle longitudinal axis of the headlamp setting test station, i.e. it has a preferably fixed spacing from the headlamps so that an unwanted falsification of the measured value due to distance changes can be avoided.

It can be relatively easily be recognized by the operator whether the contact patches of the front wheels are at the position provided for them. The center of the contact patch of a front wheel can, for example, be estimated by the eye of the operator and can be aligned with a marking provided on the floor. This fixed position then serves as a zero point for the measurement of the topography of the headlamp setting test station.

Different vehicles have different wheel bases so that the contact patches of the rear wheels always have a minimum distance from the contact patches of the front wheels even for comparatively short vehicles so that it is not necessary to measure vertical differences in the region of this minimum distance. There is only a limited maximum wheel base for passenger cars so that vertical differences only have to be measured in intervals between the minimum distance and a maximum provided distance.

The number of measured points can be selected as desired; a large number of measured points, for example one measured point for each centimeter of distance, is, however, probably an exaggeration, particularly since the contact patch of a tire extends over at least approximately 15 cm and the deformation of the tire in the contact patch effects an equalizing effect on the local unevenness.

With multitrack vehicles such as passenger cars, there are also minimum track widths that have to be taken into account. Measured points that are in the region of these minimum track width are likewise not necessary. There are also maximum track widths that have to be considered. Measured points that are outside the maximum track width to be expected are likewise not necessary.

It is particularly favorable and preferred in accordance with the invention if markings are provided on the headlamp setting test station whose position data are associated with the tabular values. These markings can be a tapeline fixed or adhered or printed on the floor or a meter scale, with the operator then only reading the center of the contact patch of the respective rear wheel as an indication of the respective wheel base and then having to enter this value into the headlamp setting test device to read the vertical difference associated with this wheel base or a value corresponding thereto—such as an angular deviation—from the data memory or to take it into account in the compensation.

Strictly speaking, it is also not necessary that the contact patch of the front wheel is brought to a fixedly predefined position since a plurality of measured points can also be provided in the region of the notional position of the front wheel and the vertical difference or a value corresponding thereto from the respective assumed position of the contact patch of the front wheel and of the contact patch of the rear wheel can be taken into account in the compensation.

It is also not absolutely necessary that the contact patch of the front wheel has a predefined spacing from the headlamp setting test device since the compensation in accordance with the invention can anyway be implemented with a fixed positioning of the headlamp setting test device in the longitudinal direction of the headlamp setting test station and with a known position of the contact patch of the front wheel that can be read from the floor marking.

It is also not absolutely necessary that the contact patch of the one front wheel is on the one side of a multitrack vehicle at the same level as the contact patch of the other front wheel on the other side of the multitrack vehicle. The topography of the headlamp setting test station can namely be compensated independently of its evenness by means of the invention. As a rule, it is sufficient to consider each side of the vehicle per se. If an oblique position of the vehicle arises due to a pronounced vertical difference between the contact patches of the two front wheels that could result in a critical incorrect positioning of the headlamps, this can also be compensated.

The headlamp setting test device typically comprises a manual input possibility for the respective positional indications in accordance with the position of at least the rear wheel of the tested vehicle or the positions of the front wheel and of the rear wheel. A manual input is very simple to implement and forces the operator to keep it in mind. It would, however, also be possible to capture the respective positions optically or electromagnetically and to take them into account for the compensation.

The topography of the intended headlamp setting test station can be captured by a scanning device that scans the headlamp setting station. The scanning device can at least be a laser, an ultrasound measuring device, a radar measuring device, or another coordinate measuring device.

As indicated above, the headlamp setting test station provided in accordance with the invention is preferably provided with markings that mark the possible contact patches of a rear wheel and possible contact patches of a front wheel on the headlamp setting test station whose positional indications can preferably be associated with tabular values of the vertical differences between the possible contact patches of a rear wheel and possible contact patches of a front wheel.

The invention further comprises a headlamp setting device. If the respective current setting of a headlamp is electronically detected by means of a digital camera, an interface can be provided by means of which its data can be exchanged between the headlamp setting test device and a headlamp to correct the setting, preferably automatically, with reference to a measured deviation of a headlamp setting from a desired setting. Modern vehicles are frequently equipped with electronically adjustable headlamps so that a feedback to the headlamp setting test device can be inexpensively established. Input errors can furthermore be avoided here to ensure that the headlamp setting is carried out correctly on the basis of the headlamp setting test.

Particular methods for testing a headlamp setting can be seen from claims 14 to 18.

Figure 2:
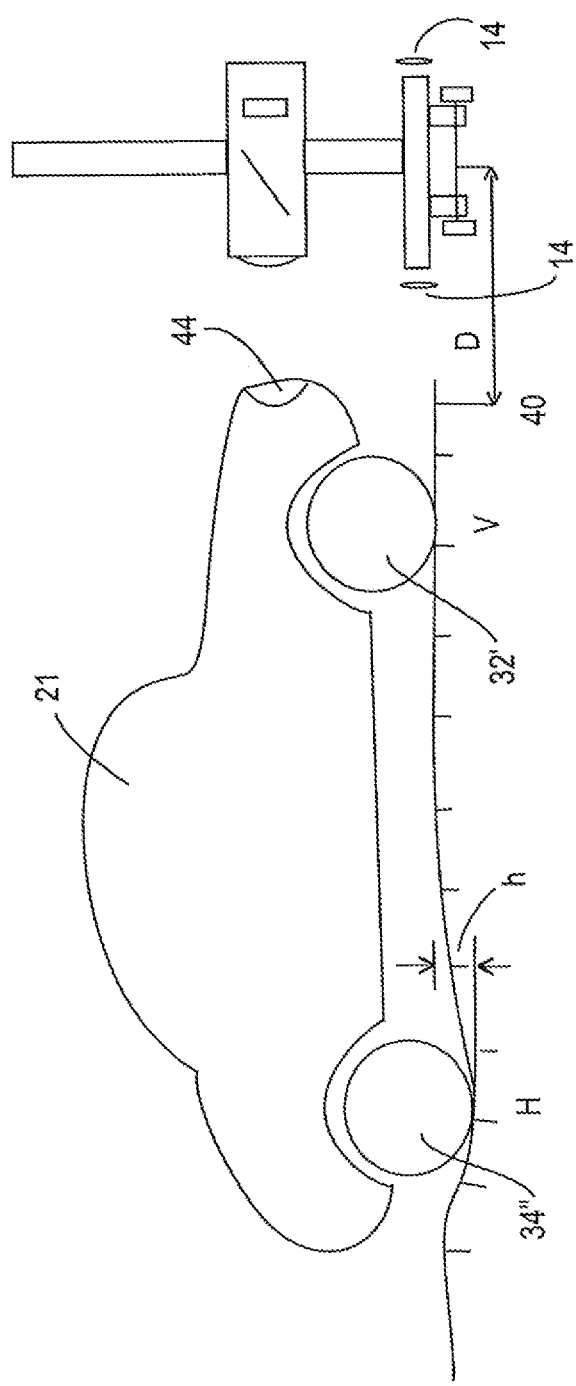
Figure 3:
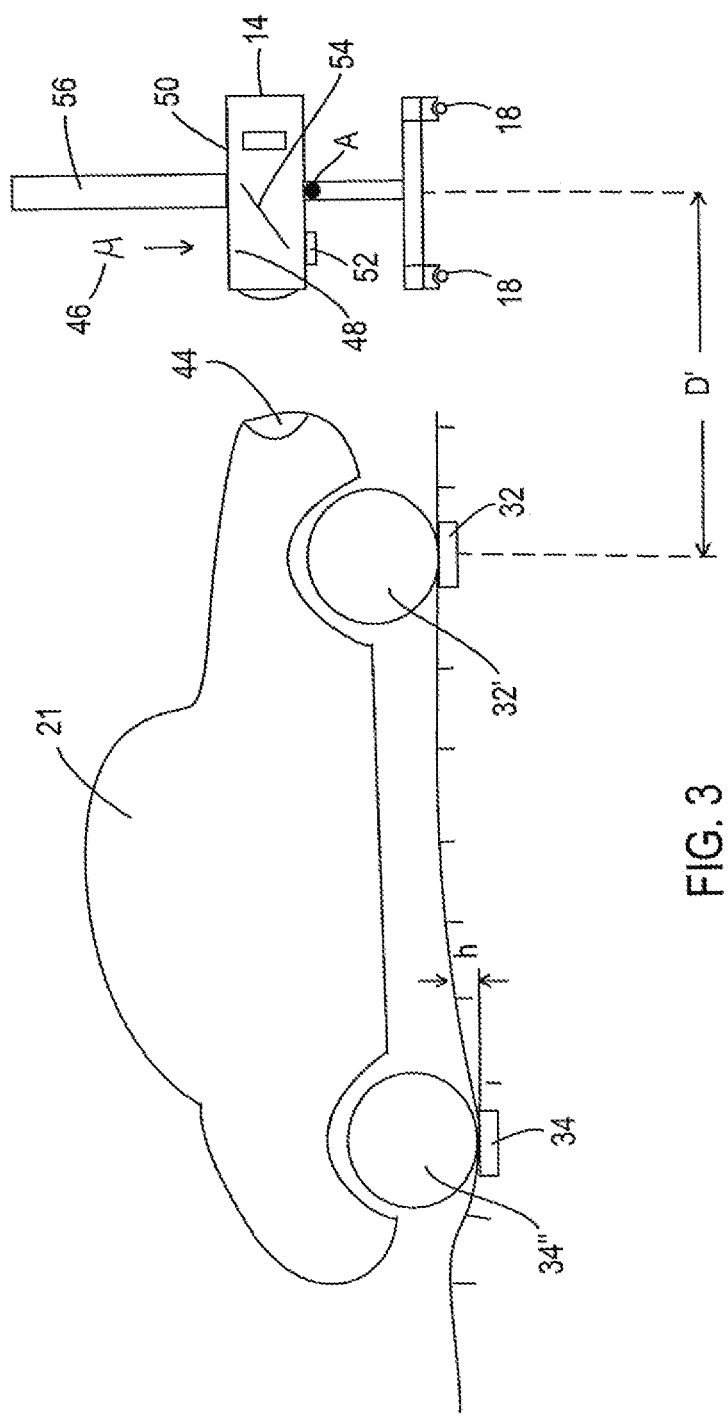
Figure 4A:
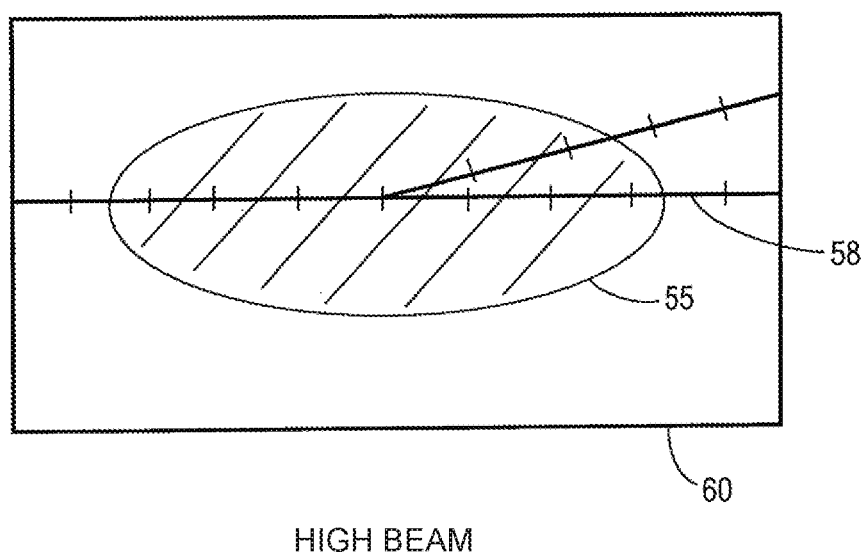
Figure 4B:
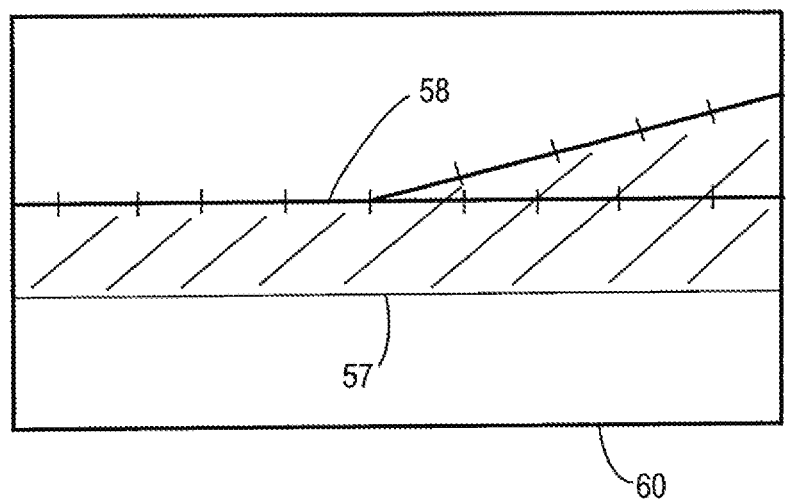
Figure 4C:
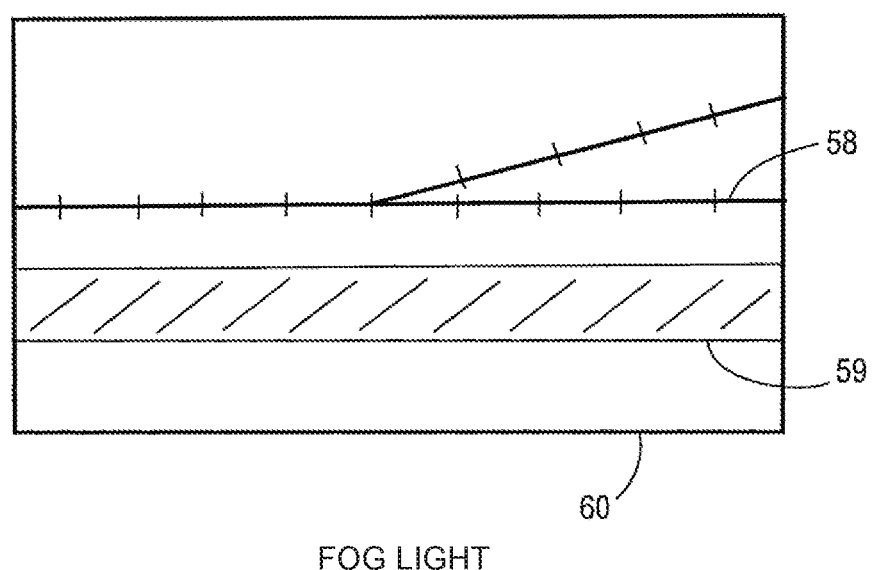
Figure 5A:
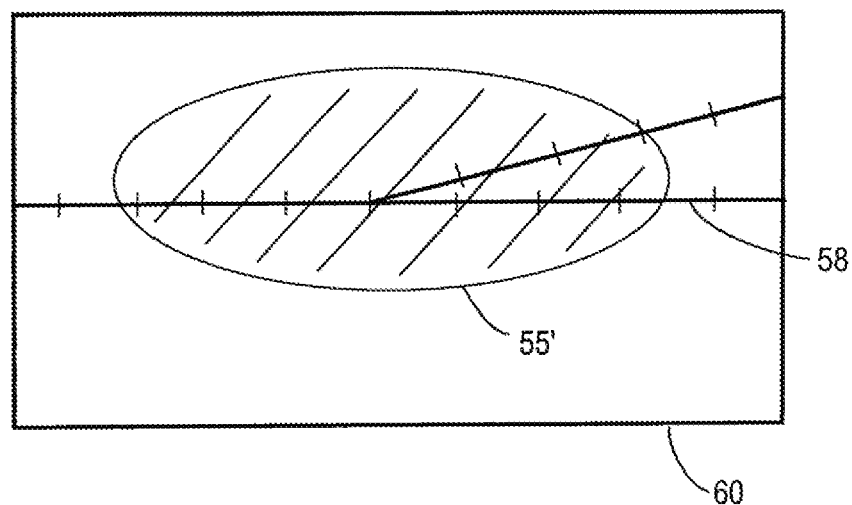
Figure 5B:
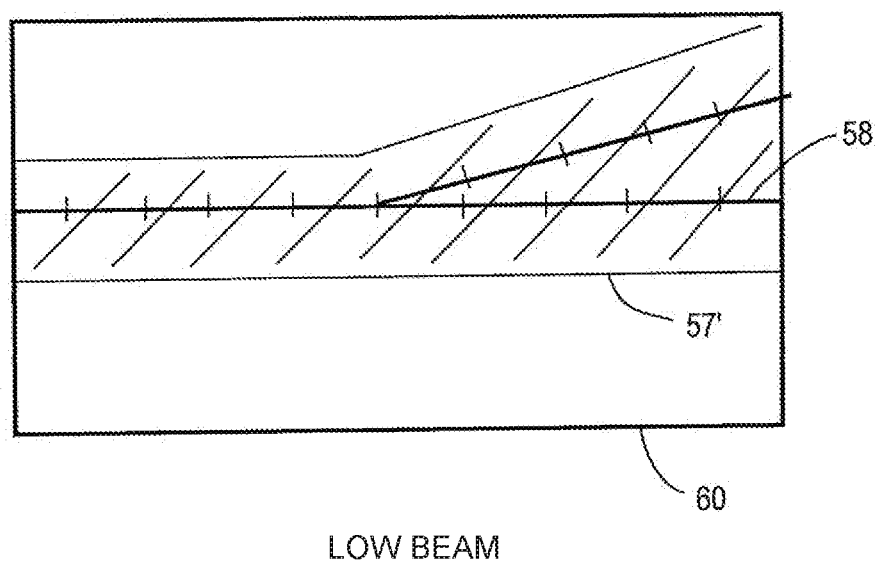
Figure 5C:
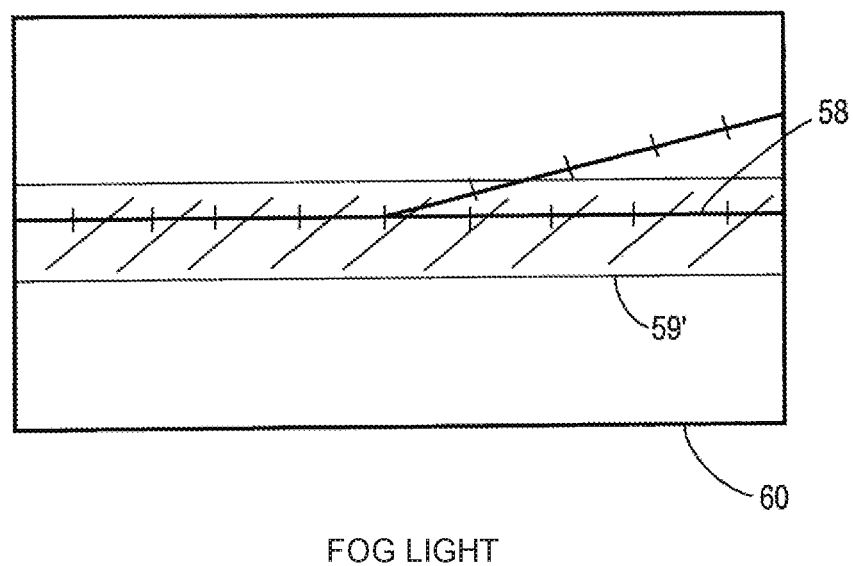
Figure 6A:
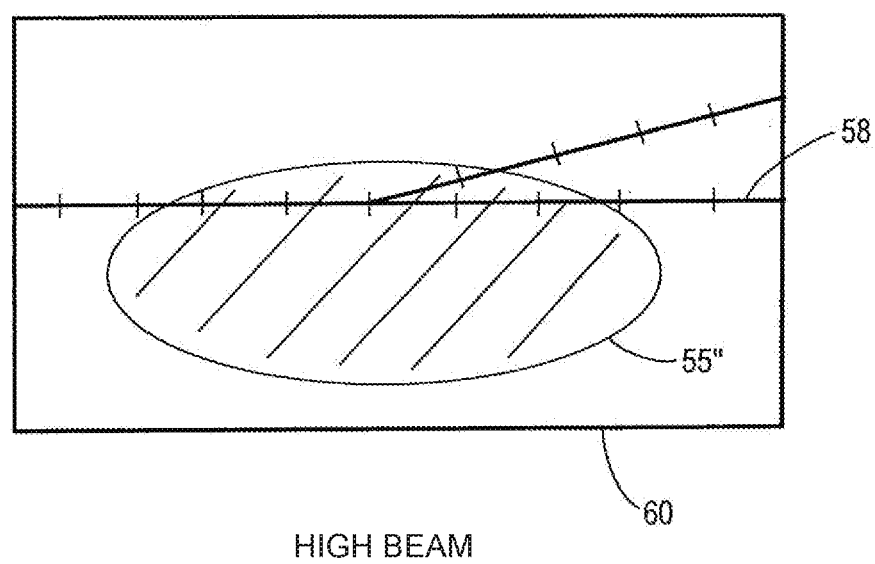
Figure 6B:
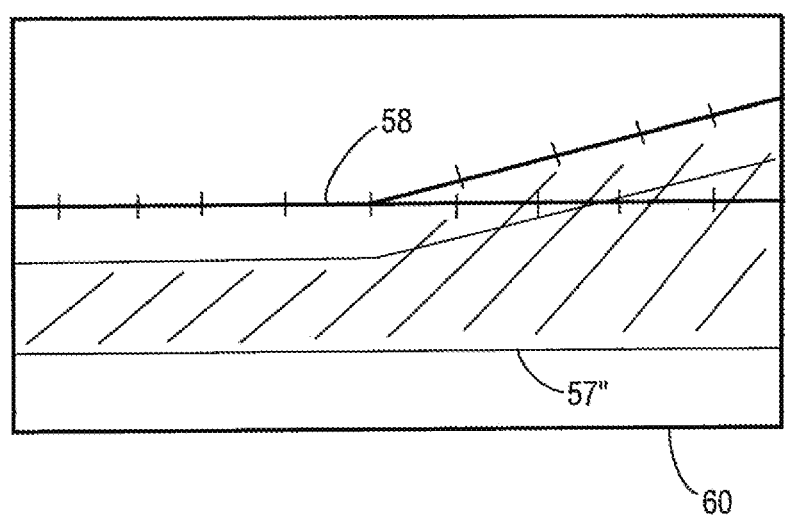
Figure 6C:
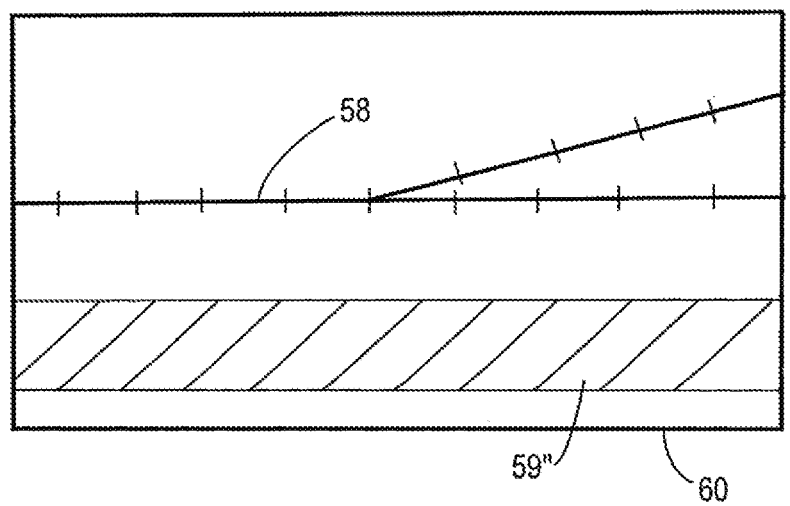
Figure 7:
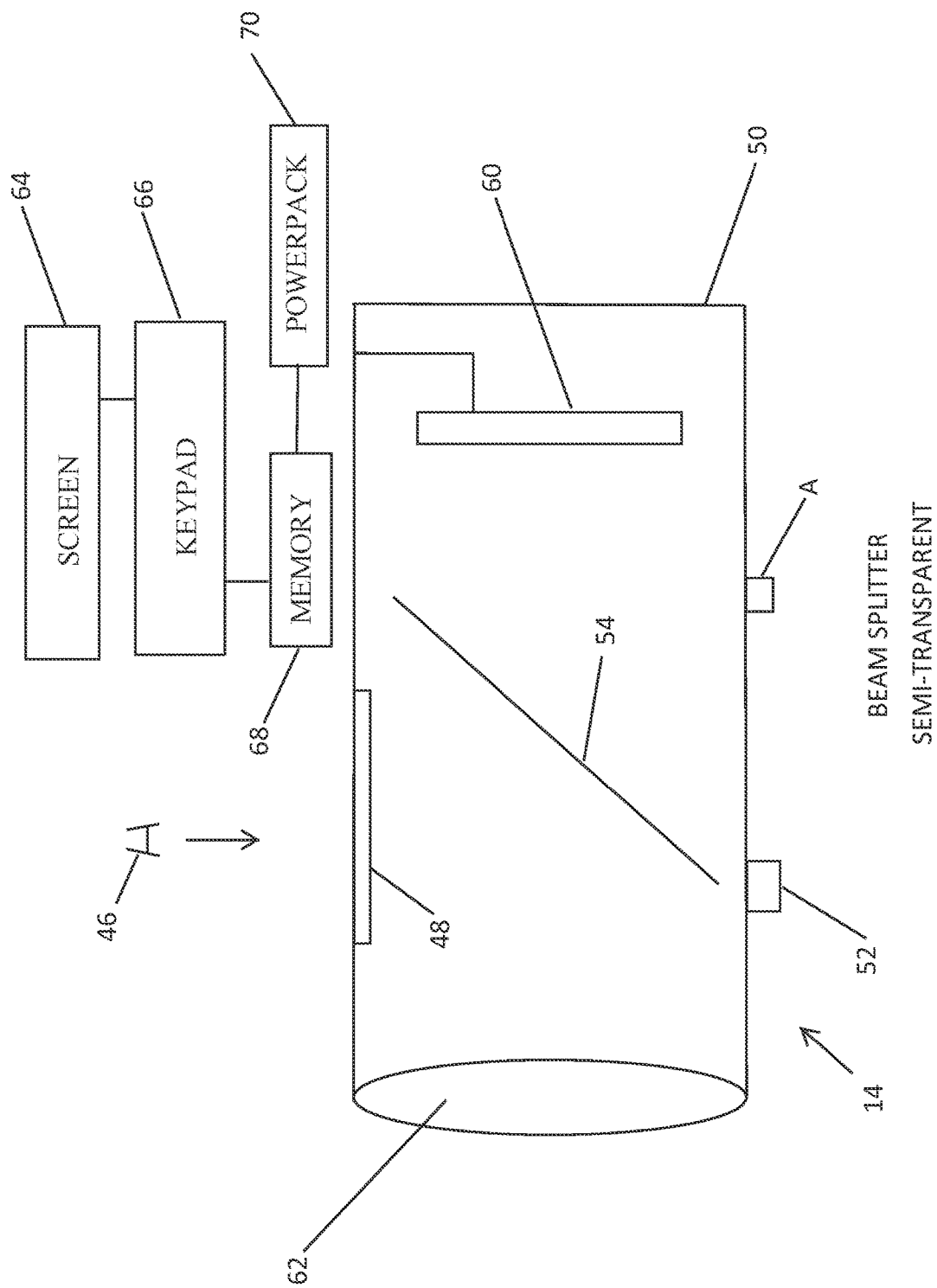
Figure 8:
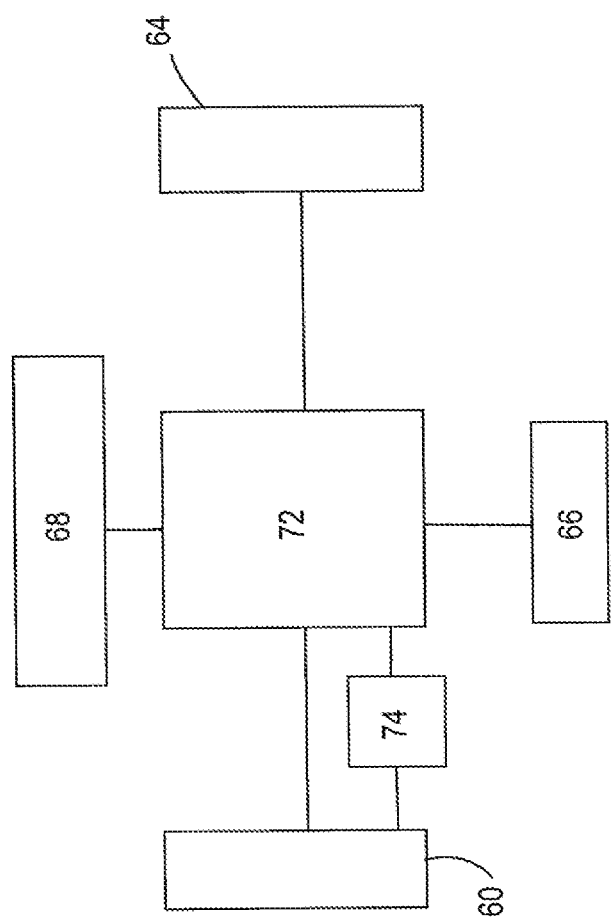
Figure 9:
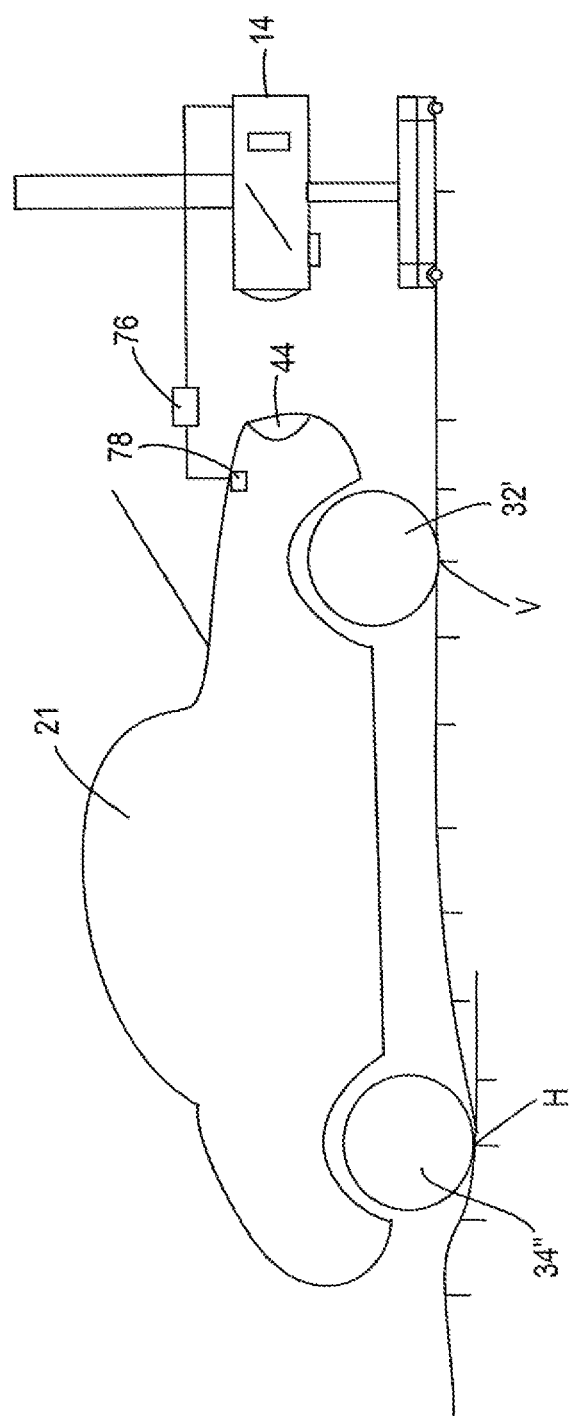

The invention will be explained in more detail in the following with reference to embodiments and to the drawing, in which there are shown:

FIG. 1 a schematic plan view of a headlamp setting test station marked in accordance with the invention;

FIG. 2 a side view of a vehicle standing on the headlamp setting test station, in which side view the headlamp setting test device is movable on rollers;

FIG. 3 a representation corresponding to FIG. 2 in which the headlamp setting test device is alternatively movable on rails;

FIGS. 4A to 4C representations of the image to be expected of the light lobe of a common headlamp in the headlamp setting test device, where FIG. 4A shows the image for the high beam and FIG. 4B shows the image for the low beam, while FIG. 4C represents a typical image of the light lobe of a fog lamp;

FIGS. 5A to 5C representations in accordance with FIGS. 4A to 4C, but for the case that the rear wheel on the tested side is lower than the front wheel on the tested side;

FIGS. 6A to 6C representations in accordance with FIGS. 4A to 4C, but for the case that the rear wheel on the tested side is higher than the front wheel on the tested side;

FIG. 7 a schematic representation of various components of a headlamp setting test device in accordance with the invention with a CMOS camera, an input keypad, a data memory, a screen, and a powerpack;

FIG. 8 a schematic representation of further components of a headlamp setting test device in accordance with the invention; and FIG. 9 a schematic representation similar to FIG. 2 or FIG. 3, but with additional feedback to a headlamp setting apparatus of the vehicle.

FIG. 1 first shows a schematic plan view of a headlamp setting test station 10 configured in accordance with the invention. A rectangular floor marking 12 within which the headlamp setting test device 14 in accordance with the invention is arranged displaceably to and fro in accordance with the arrow direction 16 is located at the left end of the headlamp setting test station 10. The headlamp setting test device 14 is here installed at a base frame having wheels (see e.g. FIG. 2) and the user only has to take care that the wheels of the base frame always run within the marking 12 and are strictly aligned with this marking. The headlamp setting test device 14 could instead run on a fixedly installed rail 18 or on a rail system (such as is shown in the side view of FIG. 3) that form an equivalent alternative to the wheels.

A larger rectangular region 20 within which the vehicle 21 to be tested (see e.g. FIG. 2) has to be arranged is located at the right next to the rectangular marking 12. A headlamp setting test station 20 is shown here that is configured both for the testing of the headlamps of trucks and of passenger cars and motorcycles. If the headlamp setting test station is only provided for testing passenger cars and motorcycles; the region 20 can be correspondingly smaller.

A marking 24 that is marked in meters and centimeters is located along the one longitudinal side 22 of the headlamp setting test station 10. The marking can be on the floor, but is preferably implemented by an adhered tapeline. Further corresponding markings 25, 28, and 30 that are all aligned with one another and with the marking 24 are located in parallel with the marking 24 on the one longitudinal side 22 of the headlamp setting test station 10.

In this example, reference numeral 32 indicates a contact patch of the right front wheel of a vehicle 21; 34 indicates a contact patch of the right rear wheel of the vehicle 21; 36 indicates a contact patch of the left front wheel of the vehicle 19; and 38 indicates a contact patch of the left rear wheel of a passenger car. Since vehicles 19 come in different lengths and with different wheelbases, reference is schematically made by reference numerals 34' and 38' to the contact patches of the right and left rear wheels of a longer passenger car.

In this example, the position of the wheels on the contact patches 32 and 34 on the right hand side of the vehicle can be read from the marking 24 formed as a tapeline, while the position of the wheel on the contact patches 36 and 38 on the left hand side of the vehicle 21 can be read from the marking 26 formed as a tapeline. The respective center positions of the wheels on the contact patches 36, 36', 38, 38' are measured at the markings formed as tapelines 24, 26.

The further markings 28 and 30 make it possible to measure or read the wheel positions on the contact patches 36, 38, 38' of the wheels on the left hand side of the vehicle 21. Further or fewer markings such as 28 and 30 can be provided depending on which kinds of vehicles 21 are tested. If only the headlamps of motorcycles (not shown) are tested, a single marking 24 is sufficient.

Irrespective of which kind of vehicle 21 is to be tested it is driven onto the headlamp test station 10 such that the wheels on the right hand side of the vehicle (or both wheels of a motorcycle) are located close to the marking 24.

Independently of the kind of vehicle that is to be tested, the vehicle 21 is preferably positioned on the headlamp setting test station 10 such that the front wheels are on the front contact patches 32, 36 so that the headlamps 44 (see FIG. 4) are always at a fixedly predefined relative position such as the marking 40. If the headlamps 44 are slanted, the center of the headlamp 44 should approximately be aligned with the marking 40. In modern vehicles 21, the headlamps 44 are as a rule always in front of the wheel contact patches 32, 36 of the front wheels so that the user can easily read the position of the wheels from the markings 24 and 26 or 28 or 30 that are all aligned relative to the marking 40 and thus to the floor marking 12 and of the headlamp setting test device 14 in this example.

Furthermore, indications are shown for the X, Y and Z directions of the headlamp setting station 10 in FIG. 1, with the X direction extending perpendicular to the Y and Z directions, the Z direction extending in parallel with the longitudinal side 22, and the Y direction projecting out of the plane of the drawing.

On a headlamp check, there are generally two different possibilities of arranging the headlamp setting test device 14 relative to the vehicle 21. In accordance with the first possibility, the center of the headlamps 44 is aligned with the marking 40 so that the marking 40 has a fixed spacing D from the headlamp setting test device 14 guided by the marking 12; this simplifies the headlamp setting test in accordance with the invention, but is not absolutely necessarily required.

This arrangement can also be seen from FIG. 2. It can be seen here that the right hand main headlamp 44 is vertically aligned with the marking 40 and that the right hand front wheel 32' is at a position V, while the right hand rear wheel 34" is at the position H that is considerably lower than the position V so that a vertical distance h is present between the position V of the right hand front wheel 32' and the position H of the right hand rear wheel 36'.

In the second possibility of arranging the headlamp setting test device 14 relative to the vehicle 21, the front wheels of a vehicle 21 are positioned on front contact patches 32, 36, with the front contact patches 32, 36 then having a fixed spacing from the headlamp setting test device 14 guided by the marking 12. This possibility is shown in FIG. 3.

FIG. 3 also shows how the user can look through a window 48 of the headlamp setting test device 14 with his eye 46 to check that the light box 50 of the headlamp setting test device 14 is horizontally aligned. He can here look through an inclined semi-transparent plate 54 at a spirit level 52 to optionally correct the angular position of the box 50. As customary with conventional headlamp setting test devices, the user can also move the box 50 perpendicularly along the column 56 so that the box 50 is aligned with the center of the headlamp 44.

Furthermore, a horizontal axis A of the headlamp setting test device 14 is also shown in FIG. 3. The headlamp setting test device 14 can be inclined about this horizontal axis to align the light box 50 of the headlamp setting test device 14 horizontally.

It should be noted in the example of FIG. 2 and FIG. 3 that it is preferred that the contact patches 32, 36 of the front wheels 32' are on a common vertical level, and indeed such that they are at the same vertical level as the wheels or rails 18 by means of which the headlamp setting test device 14 can be traveled from the right hand side of the vehicle to the left hand side and back.

If the headlamp setting test device is a conventional test device, the user would recognize an image 55 of the headlamp corresponding to FIG. 4A with a correctly set headlamp 44 for the high beam; he can recognize the correct position of the image with reference to the marking 58 at the screen 60.

If the low beam is switched on, the image 57 of the headlamp has the appearance as in FIG. 4B with a correct setting. The corresponding representation for the image 59 is shown in FIG. 4C for a correctly set fog lamp.

For comparison, FIGS. 5A, 5B, and 5C show comparable images 55', 57', and 59' with incorrectly set headlamps when they are set too high and would dazzle oncoming traffic in use, while FIGS. 6A, 6B, and 6C show the comparable images 55", 57", and 59" when the headlamps are set too low and would not sufficiently light up the road in use.

FIG. 7 shows a schematic representation of components of a headlamp setting test device 14 in accordance with the invention having a monitor 60 configured as a CMOS camera. The monitor 60 is arranged at an end in the box 50 of the headlamp setting test device 14. A Fresnel lens 62 configured as a headlamp light inlet window is arranged at the oppositely disposed end of the box 50.

The CMOS camera 60 is an electronic recording unit that can record a plurality of pixels of the image. A reference marking 58 (see e.g. FIG. 4A) can be associated with the pixels of the CMOS camera and its position can be compensated in accordance with the respective vertical difference h or value stored in the data memory and is in particular at least vertically displaceable.

The Fresnel lens 62 is designed to bundle the light of a headlamp, e.g. of the headlamp 44, such that it is centrally incident on the monitor 60 configured as a CMOS camera to generate images 55, 55', 55", 57, 57', 57", 59, 59', 59" there in accordance with FIGS. 4A to 6C of the respective headlamps to be examined. It must be noted here that the light of a headlamp 44 is substantially divergent and is substantially convergent after running through the Fresnel lens 62. The amplification that is effected by the Fresnel lens 62 is as a rule selected in dependence on the monitor to be used. On a use of a CMOS camera as the monitor 60, a greater amplification is preferred in comparison with a diode matrix comprising a plurality of diodes.

In the example shown of FIG. 7, the light bundled by the Fresnel lens 62 passes through the beam splitter 54. The beam splitter 54 is provided in this example so that a user of the headlamp setting test device 14 can horizontally align the box 50 comprising the components relative to the headlamp 44 in its horizontal position in that he can adjust the position of the box 50 by means of his eye 46 and of the spirit level 52.

If a level comprising the spirit level 52 is arranged at a different position in or at the box 50 than shown, a headlamp setting test device 14 in accordance with the invention could also be configured without a beam splitter 54 (not shown).

The components of a headlamp setting test device 14 further comprise a screen 64, an input option 66 configured as a keypad, a data memory 68, and a powerpack 70.

The screen 64 is configured to present results of a headlamp setting test. These results can be displayed, e.g. in a similar manner to the images of FIGS. 4a to 6C so that a user knows whether the headlamp to be tested is correctly set or not. For this purpose, the images of the respective headlamp considered as correct can additionally be displayed as a reference marking in the screen 64 so that a user can recognize at a glance whether the headlamp to be inspected differs from this or is correctly set.

The positions V, H of the wheels 32', 34" of the vehicle 21 to be inspected or the position of a respective contact patch 32, 34, 34', 36, 38, 38' of the vehicle 21 to be inspected can be input at the headlamp setting test device 14 by means of the input option 66.

The headlamp setting test device 14 thus comprises an input option for the respective positional indications corresponding to the position V, H of at least the one right hand rear wheel 34" of the vehicle 21 to be tested.

To further be able to communicate which kind of headlamp is currently being tested to the headlamp setting test device 14, this can likewise be input by means of the input option 66.

A plurality of values for vertical differences h for different possible positions H of the contact patches 34, 34', 36, 38, 38' of a rear wheel 34" with respect to possible positions V of the contact patches 32, 36 of a front wheel 32' are stored in the data memory 68. These values are used on the carrying out of the test of the headlamp setting to select and take account of the respective current value from the stored values to adapt the monitor 60 or the reference marking 58 to this vertical difference.

In addition to or instead of a value for the vertical difference h at a specific position of the rear wheel, an annular correction indication or a value comprising it can be stored in the data memory and the position of the monitor 60 or of the reference marking 58 can be adapted with reference to it.

The data memory 68 comprises different data. They can e.g. correspond to the topography of the respective headlamp setting test station 10, i.e. to the actual X, Y, Z positions of the floor of the headlamp setting test station 10. Additionally or alternatively to this, data can also be provided that comprise tabular values that correspond to the respective vertical difference between possible contact patches of a rear wheel and possible contact patches of a front wheel on the headlamp setting test station 10. The markings 24, 26, 28, 30 provided on the headlamp setting test station 10 are preferably positional indications that are associated with the tabular values.

The data that are stored in the data memory 68 can be detected by a scanning device of any kind that is configured to scan the headlamp setting station 10 so that vertical differences h in the Y direction (see FIG. 1) of the different positions of the wheels of a vehicle 21 relative to one another are stored in the data memory.

E.g. a respective vertical difference h in the Y direction between the contact patches 32, 36 of the front wheels 32' and the contact patches 34, 38 of the rear wheels 34" for distances in the Z direction (see FIG. 1) in the 20 cm range, preferably in the 15 cm range, in particular in the 5 cm range, and particularly preferably in the range of 1 cm, can be stored.

Furthermore, a respective vertical difference h in the Y direction between the contact patches 32, 36 of the front wheels 32' and the contact patches 34, 38 of the rear wheels 34" for different track widths can be stored; the vertical differences h can be stored for different track widths in the X direction (see FIG. 1) with distances in the 15 cm range, preferably in the 10 cm range, in particular in the 5 cm range, and particularly preferably in the range of 1 cm.

The powerpack 70 is used to supply the individual power-consuming components of the headlamp setting test device 14 with power. The powerpack 70 can for this purpose also be a battery that can be charged by means of a power supply (not shown).

FIG. 8 shows a further schematic view of components of the headlamp setting test device 14 in accordance with the invention. They additionally include an evaluation unit 72 that is connected to the monitor 60, to the screen 64, to the data store 68, and to the input option 66.

The evaluation unit 72 can additionally be connected to a setting device 74. The setting device 74 can be configured to move the position of the monitor 60 or of the box 50. These movements can e.g. comprise a displacement in the vertical position and/or an inclination about a horizontal axis.

FIG. 9 shows a schematic representation similar to FIG. 2 or FIG. 3. An additional interface 76 is provided in this embodiment. A deviation of the headlamp 44 detected with reference to the monitor 60 of the headlamp setting test device 14 and recognized in the evaluation unit 72 can be corrected, preferably automatically, by means of a headlamp setting test device 78.

With an uneven floor, the light of a correctly set headlamp 44 is incident on the monitor 60 at a different height than that that is indicated by the reference marking 58. If the rear wheels 34", i.e. their contact patches, are lower than the front wheels (see e.g. FIG. 3), a state is displayed on the monitor 60 that communicates to the user in a similar manner to FIGS. 5A to 5C that the headlamps are set too high. If the rear wheels 34" are higher than the front wheels (not shown), a state is displayed on the monitor 60 that communicates to the user in a similar manner to FIGS. 6A to 6C that the headlamps are set too low. The invention makes use of this recognition, namely by a displacement of the reference marking 58 or of the monitor 60 in dependence on the actual height of the rear wheel 34" relative to the front wheel, possibly by means of an additional movement of the position of the monitor 60.

For example, with rear wheels 34", i.e. with their contact patches 34, 38 that are lower than the front wheels 32, i.e. their contact patches 32, 36, the monitor 60 or the reference marking 58 is upwardly displaced. If the rear wheels 34", i.e. their contact patches 34, 38, are higher than the front wheels 32', i.e. their contact patches 32, 36, the monitor 60 or the reference marking 58 is downwardly displaced in accordance with the present invention.

On operation of the headlamp setting test device 14, a vehicle 21, e.g. in accordance with one of the FIGS. 2 and 3, is positioned on the headlamp setting station 10. The position of the wheels V. H is read from the markings 24 and 25 and is input by means of the input option 66 at the headlamp setting test device 14. The evaluation unit 72 can compare the input values with the values stored for this purpose in the data memory 68.

The monitor 60 or the reference marking 58 associated therewith is subsequently vertically displaced in accordance with the respective vertical difference or value stored in the data memory and/or is inclined about the horizontal axis A, whereby the position of the monitor 60 has been moved in accordance with the respective vertical difference h or value. The test result on the setting of the headlamp is not falsified by the movement of the monitor 60 or of the reference marking 58.

With small vertical differences h or with a value corresponding thereto, the data captured by means of the monitor 60 can be purely digitally corrected in the evaluation unit.

If the values stored in the database indicate a vertical difference h that cannot only be taken into account by means of a digital adaptation of the reference marking 58 in the monitor 60, but that also requires a physical displacement of the monitor 60, this displacement can be carried out by means of the setting device 74 with reference to parameters that are predefined by the evaluation unit 72. These parameters can be displayed on the screen 64 so that the user can either adapt the setting device 74 by hand or can check an automatic adaptation that is invoked e.g. by means of one or more actuators (not shown) using control commands that are predefined by the evaluation unit 72.

A headlamp setting of a headlamp can thus be tested. In that a vertical difference h between the contact patch 34, 34', 36, 36' of a rear wheel 34" arranged on the side of the respective tested headlamp and the contact patch 32, 36 of the corresponding front wheel 32' or a value corresponding to this vertical difference h is stored in advance and a correction value for the position of the image 55, 57, 59 on the monitor 60 to be expected with a correct setting is determined that compensates the effect of the vertical difference h on the evaluation of the respective setting of the respective headlamp so that the headlamp setting test can be carried out while taking account of the compensated vertical difference h.

REFERENCE NUMERAL LIST 10 headlamp setting test station
12 floor marking
14 headlamp setting test device
16 arrow direction
18 rail
20 region
21 vehicle
22 longitudinal side
24 marking, tapeline
26 marking, tapeline
28 marking
30 marking
32 contact patch, right front wheel
32' right front wheel
34, 34' contact patch, rear wheel
34" right rear wheel
36 contact patch, left front wheel
38, 38' contact patch, left rear wheel
40 marking
44 headlamp
46 eye
48 window
50 box
58 spirit level
54 plate
55, 55', 55" image
56' column
57, 57', 57" image
58 marking
59, 59', 59" image
60 monitor
62 Fresnel lens
64 screen
66 input option
68 data memory
70 powerpack
72 evaluation unit
74 setting unit
76 interface
78 headlamp setting apparatus
A horizontal axis
H position
h vertical difference
V position

The invention claimed is:

1. A test apparatus for headlamps of vehicles, comprising:
    a lens directing an image of the tested headlamp to a monitor,
    a data memory for data corresponding to the topography of a floor area of a headlamp setting test station, the data relating to respective vertical differences between possible contact patches of a rear wheel and possible contact patches of a front wheel of a vehicle present on the floor area of the headlamp setting test station, or values corresponding to these vertical differences,
    a correction possibility for the position of the image on the monitor that takes account of the respective vertical difference or value, whereby the effect of the vertical distance on the evaluation of the respective setting of the respective headlamp can be compensated; and
    an input option for respective positional indications corresponding to the position of at least the rear wheel of the tested vehicle.

2. The test apparatus in accordance with claim 1, wherein the monitor comprises at least one of a pixel recording digital camera, a CMOS camera, a CCD camera, and another electronic recording unit recording pixels.

3. The test apparatus in accordance with claim 2, having a reference marking in the monitor, the reference marking having a vertical position which can be compensated in accordance with the respective vertical difference or value stored in the data memory.

4. The test apparatus in accordance with claim 1, wherein the monitor is vertically displaceable in accordance with the respective vertical difference or value stored in the data memory, whereby the position of the monitor is movable in accordance with the respective vertical difference or value.

5. The test apparatus in accordance with claim 1, wherein the monitor bears a reference marking and can be inclined about a horizontal axis.

6. The test apparatus in accordance with claim 1, including a scanning device, wherein the data memory comprises data that can be captured by a scanning device that scans the headlamp setting station.

7. The test apparatus in accordance with claim 6, wherein the scanning device comprises at least one of a laser, an ultrasound measuring device, a radar measuring device, and another coordinate measuring device.

8. The test apparatus in accordance with claim 1, including a floor area having markings that mark possible contact patches of a rear wheel and possible contact patches of a front wheel.

9. The test apparatus in accordance with claim 1, wherein an interface is provided by means of which data can be exchanged between the monitor and a headlamp to correct a setting of the headlamp with reference to a measured deviation of a headlamp setting from a desired setting.

10. A method of testing a headlamp using a lens directing an image of a tested headlamp of a vehicle standing on a floor area of known topography to a monitor, wherein a vertical difference between a contact patch on the floor area of a rear wheel arranged on a side of the vehicle corresponding to the respective tested headlamp and a contact patch on the floor area of the corresponding front wheel or a value corresponding to this vertical difference, is determined from the known topography, is stored and a correction value for the expected position of the image on the monitor with a correct setting of the headlamp is determined, the effect of the vertical difference on the evaluation of the respective setting of the respective headlamp is compensated, and the test is carried out while taking account of the compensated vertical difference.

11. The method in accordance with claim 10, wherein a plurality of values for vertical differences are determined from the known topography for different possible positions of the contact patches on the floor area of a rear wheel with respect to possible contact patches on the floor area of a front wheel and are stored in a data memory; and wherein the respective position of the contact patch of the rear wheel on the floor area with respect to the contact patch of the front wheel on the floor area is used in the carrying out of the test of the headlamp setting to select the respective current value of the vertical difference from the stored values and with the respective current value of the vertical difference being taken into account for the required compensation.

12. The method in accordance with claim 11, wherein the monitor includes is at least one of a pixel recording digital camera, a CMOS camera, a CCD camera, and another electronic recording unit recording pixels, and wherein a reference marking is associated with the pixels, with a position of the reference marking being is compensated and at least vertically displaced in accordance with the respective vertical difference or value stored in the data memory.

13. The method in accordance with claim 11, wherein the monitor is at least one of vertically displaced in accordance with the vertical difference and inclined about a horizontal axis, whereby the position of the monitor is movable in accordance with the respective vertical difference or value and the test result does not falsify the setting of the headlamp.

14. The method in accordance with claim 13, wherein the monitor bears a reference marking and the reference marking is at least one of vertically displaced in accordance with the respective vertical difference or value stored in the data memory and inclined about a horizontal axis, whereby the position of the reference marking is movable in accordance with the respective vertical difference or value and the test result does not falsify the setting of the headlamp.

15. A method of testing a headlamp using a lens directing an image of the headlamp to a monitor, wherein:
a vertical difference between a contact patch on the floor area of a rear wheel arranged on the side of the respective tested headlamp and the contact patch of the corresponding front wheel or a value corresponding to this vertical difference is stored and a correction value for the expected position of the image on the monitor with a correct setting of the headlamp is determined;
the effect of the vertical difference on the evaluation of the respective setting of the respective headlamp is compensated; and,
the headlight setting test is carried out while taking account of the compensated vertical difference;
wherein a plurality of values for vertical differences are determined for different possible positions of the contact patches of a rear wheel with respect to possible contact patches of a front wheel and are stored in a data memory; and,
wherein the respective position of the contact patch of the rear wheel with respect to the contact patch of the front wheel is used in the carrying out of the test of the headlamp setting to select the respective current value from the stored values and with the respective current value being taken into account for the required compensation.

16. The method in accordance with claim 15, wherein the monitor is a pixel recording digital camera with a reference marking being associated with the pixels whose position is compensated in accordance with the respective vertical difference or value stored in the data memory.

17. The method in accordance with claim 15 wherein the monitor is vertically displaceable in accordance with the vertical difference and/or can be inclined about a horizontal axis, whereby the position of the monitor is movable in accordance with the respective vertical difference or value and the test result does not falsify the setting of the headlamp.

18. The method in accordance with claim 15, wherein the monitor bears a reference marking and is vertically displaceable in accordance with the respective vertical difference or value stored in the data memory and/or can be inclined about a horizontal axis, whereby the position of the reference marking is movable in accordance with the respective vertical difference or value and the test result does not falsify the setting of the headlamp.

* * * * *